(No Model.)

S. T. McDOUGALL.
APPARATUS FOR CONCENTRATING SULPHURIC ACID.

No. 289,293. Patented Nov. 27, 1883.

WITNESSES

INVENTOR.
Samuel T. McDougall.

UNITED STATES PATENT OFFICE.

SAMUEL T. McDOUGALL, OF BROOKLYN, NEW YORK.

APPARATUS FOR CONCENTRATING SULPHURIC ACID.

SPECIFICATION forming part of Letters Patent No. 289,293, dated November 27, 1883.

Application filed March 1, 1883. (No model.)

*To all whom it may concern:*

Be it known that I, SAMUEL T. McDOUGALL, residing at Brooklyn, in the county of Kings and State of New York, have invented a new and useful Improvement in Processes of and Apparatus for Concentrating Sulphuric Acid; and I do hereby declare that the following is a full, clear, and exact description of the invention, which will enable others skilled in the art to which it appertains to make and use the same, reference being had to the accompanying drawings, and to the letters of reference marked thereon, which form a part of this specification, in which—

Figure 1:
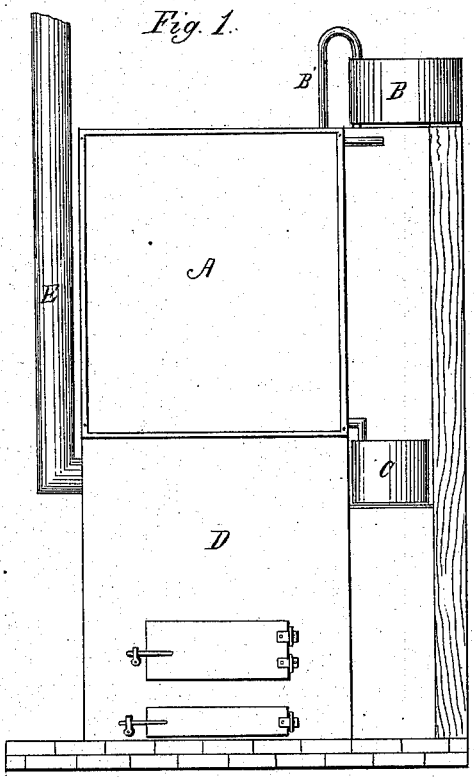
Figure 2:
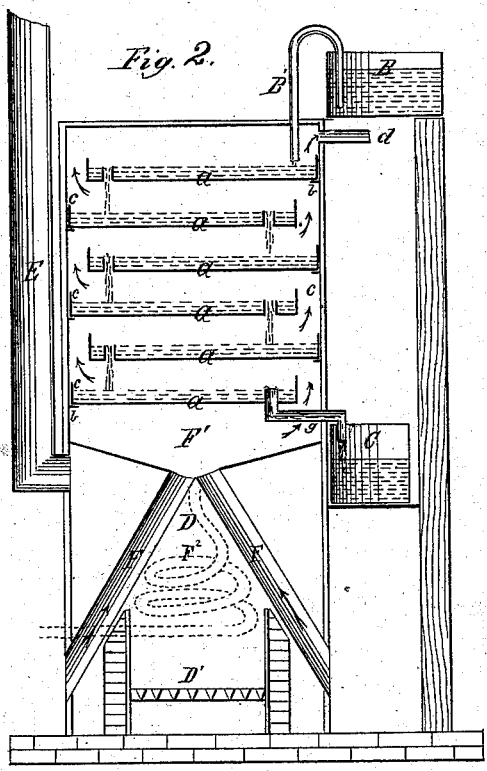
Figure 3:
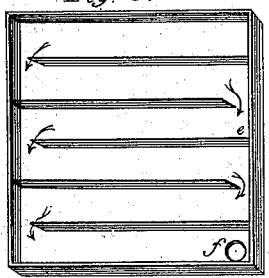

Figure 1 is a vertical elevation. Fig. 2 is a central vertical elevation in section. Fig. 3 is a top view of the vaporizing-pans.

The object of my invention is to rapidly and cheaply concentrate dilute sulphuric acid; and it consists in the arrangement and construction of the vaporizing-pans, the heating arrangement, and the combination of the various parts, as hereinafter described.

The process consists in applying hot air or steam to the upper and under surfaces of vaporizing-pans, having a continuous stream of dilute acid flowing back and forth through a series of pans, arranged as hereinafter described.

In the drawings, Fig. 1 represents a vertical elevation of my improved concentrating apparatus. A is a concentrating-chamber. B is an acid-pan for holding the dilute acid to be concentrated, and it is constructed of lead in the usual form. B' is a lead siphon. C is a receiver for the concentrated acid. D is the air or steam heating furnace. E is a smoke-pipe from the furnace.

Fig. 2 is a central vertical elevation, in section, showing the interior construction. The walls of the concentrating-chamber may be constructed of iron or brick, or other suitable material, preferably coated inside with porcelain or enamel. *a a* are concentrating or vaporizing pans. These pans are made up of metal or vitreous substances, preferably of iron enameled. They rest on short projections inside the chamber A, as shown at *b b*. They do not extend the full width of the chamber one way, but are placed against the side alternately, as shown at *c c*, thus leaving a passage-way for hot air or steam under and around one side and over each pan, as shown by the arrows. The hot air or steam is discharged at *d*, and can be used to heat the acid-pan B. If sufficient force is not given to the hot air or steam in the concentrating-chamber to carry off the vapor from the pans, it can be exhausted from the pipe *d* and condensed. The pans *a a* have cross-pieces rising up from the bottom and reaching nearly across the pan, every alternate cross-piece being attached to the rim of the pan, as shown at *e*, Fig. 3. At one corner of the pan, where the cross-piece is attached to the outer rim, a pipe rises up a short distance, with an opening through the pipe and bottom of the pan, as shown at *f*, Fig. 3. The acid to be concentrated is run from the pan B through the siphon B' into the upper pan, *a*. It will flow across the bottom of the pan and around the cross-pieces back and forth until it reaches the pipe *f*, and will rise up and overflow through the pipe *f* into the pan below. All the pans being constructed the same, the acid will continue to flow down to the outlet in the lowest pan and be discharged (concentrated) through the pipe *g* into the receiver C. The number of pans required depends upon the heat used, and the degree to which it is to be concentrated. The amount of acid in the pans is determined by the size of the siphon and the height of the overflow-pipe *f*. In small works one pan is used. It may have a close-fitting cover, with a vapor and siphon opening in the cover, and placed in a brick or iron furnace; or it can be placed in a furnace of the same construction as Fig. 2. The vaporizing-pans can be examined by removing a portion of the front of the chamber, which is held together by bolts and nuts or clamps. The outside of the heating chamber or furnace D is made of metal or brick. In the lower part is a fire-box lined with fire-brick, with grate-bars and ash-pit, as shown at D'. F F are air-pipes passing from near the bottom of the furnace to the hot-air chamber F'. When superheated steam is used, a coil of pipe is placed in the furnace below the heat-chamber F', as shown in dotted lines at F², the steam being supplied from any source of live steam; or it may be made in the furnace.

The operation of my apparatus is continuous, and is as follows: The fire in the furnace having been ignited, the heated air or steam is forced up into the chamber F' and under, around, and over the pans $a$, the pans $a$ having been supplied with dilute sulphuric acid, as previously described. The vapor or steam from the pans will be carried upward by the force given to the hot air or steam from the furnace, and be discharged or exhausted from the opening $d$, as previously mentioned. The concentrated acid is discharged from the lowest pan through the pipe $g$ into the receiver C.

The advantages are economy in time, labor, fuel, and space, as an apparatus will occupy no more space than an ordinary upright steam-boiler.

I am aware that heat and steam have been applied to a series of pans in the concentration of sulphuric acid; but I am not aware that they have been applied to a series of pans constructed and arranged substantially the same as my invention and producing the effect claimed by me.

Having fully described my invention, what I desire to claim and secure by Letters Patent is—

1. In an apparatus for concentrating sulphuric acid, the combination of a series of shallow partitioned pans—one placed above the other and communicating with each other—the said pans being inclosed in an upright chamber, with an opening at or near the top of the chamber through which the vapor or steam from the pans is carried off by the current induced from below or by exhausting, all constructed and arranged substantially as described.

2. In an apparatus for concentrating dilute sulphuric acid, the vaporizing-pan $a$, constructed with partitions running nearly across the bottom of the pan, and with an overflow or outlet pipe, every alternate partition being attached to the side of the pan, thereby causing the acid to flow back and forth through or on the bottom pan to the outlet, in combination with a cover or casing having inlet and outlet openings, substantially as described.

3. In a concentrating apparatus for dilute sulphuric acid, the furnace D, constructed of any suitable material, with its air and steam pipes and heat-chamber arranged to operate as herein shown and described.

4. In a concentrating apparatus for dilute sulphuric acid, the combination of the following parts: the vaporizing-chamber A, acid-pan B, siphon B', the partitioned pans $a$, pipe $g$, receiver C, heat-chamber F', and furnace D, arranged and operated substantially as shown and described.

5. The combination of two or more vaporizing-pans $a$ $a$, vaporizing-chamber A, said vaporizing-pans arranged in the chamber A so that the heated air, steam, or vapor will pass up at one side of every alternate pan, and the heat-chamber F', and coil or steam pipe F², substantially as shown and described.

SAMUEL T. McDOUGALL.

Witnesses:
T. THORNTON CALLAGAN,
S. BALDWIN CHAPMAN.